United States Patent
Huang et al.

(10) Patent No.: US 10,209,156 B2
(45) Date of Patent: Feb. 19, 2019

(54) MICROMACHINED PRESSURE SENSOR AND METHOD OF MAKING THE SAME

(71) Applicants: Liji Huang, Santa Clara, CA (US); Chih-Chang Chen, Cupertino, CA (US)

(72) Inventors: Liji Huang, Santa Clara, CA (US); Chih-Chang Chen, Cupertino, CA (US)

(73) Assignee: Wisenstech Ltd., Santa Clara, CA (US)

( * ) Notice: Subject to any disclaimer, the term of this patent is extended or adjusted under 35 U.S.C. 154(b) by 265 days.

(21) Appl. No.: 15/380,035

(22) Filed: Dec. 15, 2016

(65) Prior Publication Data

US 2018/0172532 A1   Jun. 21, 2018

(51) Int. Cl.
*G01L 9/00* (2006.01)

(52) U.S. Cl.
CPC .......... *G01L 9/0051* (2013.01); *G01L 9/0054* (2013.01)

(58) Field of Classification Search
CPC ..... G01L 19/147; G01L 9/0042; G01L 19/04; G01L 9/0072; G01L 13/025; G01L 9/0054; G01L 9/0075; G01L 19/0038; G01L 19/0084; G01L 19/14; G01L 19/0069; G01L 19/0618; G01L 19/0645; G01L 9/0052
USPC .................................................. 73/700–756
See application file for complete search history.

(56) References Cited

U.S. PATENT DOCUMENTS

| | | | | |
|---|---|---|---|---|
| 5,974,893 A | * | 11/1999 | Balcarek | G01L 19/0092 73/714 |
| 2002/0026835 A1 | * | 3/2002 | Jacob | G01L 9/0075 73/708 |
| 2003/0221302 A1 | * | 12/2003 | Moyer | G01K 7/183 29/25.35 |
| 2009/0178487 A1 | * | 7/2009 | Girroir | G01L 19/0092 73/716 |
| 2013/0285167 A1 | * | 10/2013 | Otte | G01L 19/0069 257/415 |

FOREIGN PATENT DOCUMENTS

WO    WO 9837393 A1 *  8/1998  .......... G01L 9/0075

* cited by examiner

*Primary Examiner* — Andre J Allen (57) ABSTRACT

The design and manufacture method of a pressure sensor utilizing thermal field sensing with a thermal isolated membrane of a diaphragm structure is disclosed in the present invention. This device is made with silicon micromachining (a.k.a. MEMS, Micro Electro Mechanical Systems) process for applications of pressure measurement with large dynamic range, high accuracy and high stability during temperature variation. This device is applicable for all types of pressure metrology. The said thermal field pressure sensing device operates with thermistors on a membrane of the diaphragm structure made of silicon nitride with a heat isolation cavity underneath or a single side thermal isolated silicon nitride membrane with a reference cavity. This device can be seamlessly integrated with a thermal flow sensor with the same process.

12 Claims, 7 Drawing Sheets

Schematic of the operation principle.

FIG. 1. Schematic of the operation principle.

FIG. 2. Sensor schematic on a membrane with silicon substrate.

FIG. 3. Bulk silicon with electrical insulation membrane.

FIG. 4. Deposition of heater and temperature sensor.

FIG. 5. Formation of interconnection for heater and sensors.

FIG. 6. Form passivation layer.

FIG. 7. Form thermal isolation layer.

FIG. 8. Form additional passivation/protection layer.

FIG. 9. Open heater/temperature sensor contacts.

FIG. 10. Form thermal isolation/pressure sensing cavity.

FIG. 11. Integrated pressure and flow sensor.

FIG. 12. Arrangement of the thermistors of the integrated pressure and flow sensor.

FIG. 13 (a). Package for absolute pressure sensing.

FIG. 13 (b). Package for gauge or differential pressure sensing.

FIG. 14. Actual ambient gauge pressure data acquired from a micromachined thermal field pressure sensor (TFPS).

MICROMACHINED PRESSURE SENSOR AND METHOD OF MAKING THE SAME

BACKGROUND OF THE INVENTION

1. Field of the Invention

This invention relates to micromachined silicon sensors or Micro Electro Mechanical Systems (MEMS) pressure sensing technology that measures the absolute or relative pressures in a gaseous or liquid media. The present invention also relates to thermal properties of a diaphragm based sensors. This invention additionally provides the design and make of a micromachined pressure sensor using thermal sensing principle. The present invention specifically relates design and process of making the same for a pressure sensor having compatible process flow with those for a thermal flow sensor with a diaphragm.

2. Description of the Related Art

Pressure sensor is one of the most commonly used sensing devices in multiple disciplines. There are quite a few sensing technologies that have been employed for making of the pressure sensing devices, such as piezo resistive (e.g., Izadnegahdar, A. et al, Method of manufacturing a thin piezo resistive pressure sensor, U.S. Pat. No. 6,912,759, Jul. 5, 2005); capacitive (e.g., Kimura, S. et al, Capacitive pressure sensor, U.S. Pat. No. 5,349,492, Sep. 20, 1994); optical (e.g., Knobloch, A. J., et al., High temperature optical pressure sensor and method of fabrication of the same, U.S. Pat. No. 7,966,877, Jun. 28, 2011); and thermal conductive principle (e.g. Kauffman J. Et al., Pirani pressure sensor, U.S. Pat. No. 5,633,465, May 27, 1997). Among these technologies, micromachined piezo resistive and capacitive pressure sensors are the top selections in the making. While these technologies are very mature and become cost effective, the pressure sensors made of such do have undesired performances and not cost effective in order to have high precision. For instance, the piezo resistive pressure sensors are realized via the coupled strain gauges on a diaphragm structure having Wheatstone bridge readouts. Because of the size of the piezo resistors on a membrane of the diaphragm, the local stress changes or deflections in membrane are rather small leading to a small dynamic range or low span sensitivities and large error towards the low end of detection (usually specified as the full scale errors). In addition to the large offset errors, the hysteresis and drift also limit the capability of this technology in measurement precision.

The capacitive pressure sensors have their pressure data acquired from the variation of the capacitance of the separation between a membrane and reference plate that is digitized via an application specified integrated circuitry. The capacitive pressure sensors have advantages in temperature performance, good DC responses and low power consumption. However, in order to achieve a good sensitivity the membrane size needs to be increased and the membrane thickness shall be reduced which not only lead to large device size but in return it is resulted in a significantly reduced burst pressure, increased nonlinearity in output and reduced dynamic range. Even with a limited dynamic range, the sensitivity of the capacitive sensors is similar to those of piezo resistive sensors that generally have a low sensitivity towards the low end of the dynamic range. Both of the piezo resistive and capacitive pressure sensors suffers the nonlinearity in their full span measurement data acquisition which intrinsically make them difficult to achieve the desired full span accuracy.

Bonne, U. (Absolute pressure sensor and method, U.S. Pat. No. 5,303,167, Apr. 12, 1994) teaches a dual thermal microbridge based absolute gas pressure sensor that utilizes a micromachined dual membrane structure to acquire the thermal conductivity and thermal capacitance data via the inferential calculation. Each of the said microbridges has a micro-heater and Wheatstone bridge thermistors. All parameters of the supplied currents, voltages to each of the two microheaters as well as the acquired thermal conductivities and inferentially calculated thermal capacitance of the gas medium are used to perform the polynomial fittings and calculations that are resulted in the said inferential absolute pressure of the gas medium. The detailed of the calculation is not disclosed while the nonlinearity at low pressure end is apparent. Therefore this approach although used a thermal approach to measure the absolute gas pressure, the achievable accuracy as well as the signal process complicated the device making. In addition, this sensor cannot be applied to measure the gauge pressure or differential pressure as the thermal parameters are acquired from the suspended cavity with openings to the gas medium to be measured.

Another pressure sensing device using thermal sensing principle is to measure the pressure loss in a specific channel where a thermal mass flow sensor is placed inside the channel to measure the flow rate changes due to the pressure differences between the inlet and outlet of the channel (e.g. Cohen A. and Tang J., Microflow based differential pressure sensor, U.S. Pat. No. 6,917,886, Jul. 12, 2005). Therefore this approach can only be used to measure differential pressure and will require the medium to flow through the specifically designed channel which needs to be small enough such that the pressure loss in the channel could be meaningful. Because of the limitation of the channel dimensions, such a device could mostly applied for small differential pressure measurement and in many applications it is used for measurement of flow rate in a bypass formality and cannot be applied for measurement of differential pressures without flow pass-through even though it is named as a differential pressure sensor.

As it is discussed by Leung, A. M. (Gas pressure sensor based on short-distance heat conduction and method for fabricating same, U.S. Pat. No. 6,860,153, Mar. 1, 2005), pressure sensor based on thermal conductivity shall be limited to low pressure or in the vacuum regime, and it is also subject to the sensitivity of the gas type. The narrow gap pressure sensor proposed by the said disclosure requires a fabrication of a membrane adhering to the substrate and the thermal parameters to be measured at the membrane interface. As the interface shall be critical to the data acquired which makes the fabrication very difficult and any unknown materials at the interface will alter the results.

In a disclosure by Ohji H. et al. (Pressure sensor with a thermal pressure detecting element, U.S. Pat. No. 6,393,919, May 28, 2002), a diaphragm chamber similar to a capacitive structure is proposed to measure the pressure value of a medium. A thermistor was placed at the opposite surface of the diaphragm which would be deflected by the external pressure resulting in a thermal property changes inside the chamber. The thermistor hence will sense such changes and correlate to the pressure applied to the diaphragm. While the disclosure did not indicate the chamber gap size, the proposed metal diaphragm shall not have the capability for sensing low pressures, and in particular, the thermistors placed on silicon nitride and silicon substrate combined shall make the thermistor sensing capability being nullified as the thermal conductivities of the silicon nitride and silicon combined is far larger than any trivial changes inside the proposed chamber, as it is obvious that the tiny compress of the gas inside the chamber shall not provide meaningful changes in its gas thermal (temperature) properties.

In the recent development of the applications for internet of things, as well as medical devices such as CPAP (continuous positive air pressure) personal ventilators, and many other industrial process automation, multiple sensor integration such as pressure and flow sensing integration has the increasing demands. And these requirements often ask for a miniature footprint, high sensitivity, improved accuracy and large dynamic ranges which are not available with the current state-of-the-art pressure sensor devices.

In many of the current applications, the pressure sensors are packaged into a nozzle formality to avoid any disturbance from the medium flow interference to the pressure measurement, which makes the integration of a flow and a pressure sensor even difficult. The nozzle package also limited the possibility of integration into a miniaturized formality with other sensing elements. As the nozzle has a very small passage to the pressure sensing element, any contaminant blockage shall lead to the completely loss of the functionality of the pressure sensors.

SUMMARY OF THE INVENTION

It is therefore desired to provide the design and manufacture process for a pressure sensor that shall be able to achieve high accurate pressure data in a large dynamic range without being interfered by any medium movement while performing the measurement. The said pressure sensor shall further be able to measure absolute pressure, gauge pressure and differential pressure. The said pressure sensor shall have the capability to operate in the presence of a particle or contaminants and therefore it shall be able to be package in various formalities with or without the nozzle or pressure port structure. It shall also be able to have large dynamic range and high sensitivity at low pressure measurement ends, and desirably in a linearity output. Such said pressure sensor shall also be easily manufactured with a process compatible with other sensing devices and shall be easily integrated with other sensing devices such as a flow sensor in a miniaturized footprint. It shall also be manufactured at a low cost such that it can be applied for a vast spectrum of applications.

It is an object of the present invention to employ the diaphragm based thermal measurement principle of calorimetric or time-of-flight such that the large dynamic ranges of the pressure sensing can be available as desired. For the said pressure sensors, both of the calorimetric and thermal time-of-flight approaches are utilized. The detailed design of the thermistors of these sensing elements can be found in author's previous disclosures. These said thermistors are fabricated on a thermally isolated membrane of the diaphragm structure. Such thermistors are not used to measure the changing of temperature due to the medium movement but to register the thermal field changes due to the deflection of the membrane and correlate such changes to the medium pressure. When the pressure in the measured medium is changed, it will cause the said membrane deflection and thus changing the relative positions of the thermistors on the membrane or leading to the thermal field redistribution over the membrane where these thermistors are placed. The said device for the measurement of pressure utilizing the thermal field pressure sensing is therefore referenced to thermal field pressure sensor (TFPS) which shall be able to be applied for measurement of absolute pressure, gauge pressure sensor as well as differential pressure depending on packages.

It is another object of the present invention that the sensor can be fabricated having the sensing elements exposed to the medium or having the sensing element on the membrane facing to the reference medium for which the other side of the membrane can be coated with thermal isolated materials. The response of the sensing elements at the low pressure regime shall be linear with the desired temperature performance. Therefore the present invention of thermal field pressure sensing technology shall result in a highly sensitive pressure measurement with a large dynamic range and the invented MEMS sensor structure shall make the final product easy for manufacture.

It is another object of the present invention to design a micromachined pressure sensor that can be easily fabricated in volume for the said various applications that require a low cost base. It is then desired to utilize the MEMS manufacture process that is similar to the state-of-the art integrated circuitry manufacture process. The process shall have the character of a higher volume that yields a lower cost per the said unit sensor product. MEMS manufacture process also enables the highly consistent properties for the said unit sensor product on the same silicon wafer which is important for the final assembly of the said sensor product for the said applications.

It is a further object of the present invention that the said TFPS shall be independent of any medium composition. In the said approach, the thermal time-of-flight sensing principle shall be preferred while the thermistors that sense the generation of the thermal field due to pressure induced membrane deflection can be further utilized to register the thermal conductivity of the measured medium that can further benefit for medium composition identification. The addition of a temperature sensor using the identical thermistor process shall provide additional medium temperature data that shall be desirable for applications. Such a temperature sensor shall also provide feedbacks to the thermistor heating power control and to reduce environmental effects.

It is a further object of the present invention to integrate the said TFPS together with a thermal flow sensor on the same substrate with the seamlessly compatible process flow. The process for making of the thermistors on the membrane shall be identical for both flow sensors and the said thermal pressure sensors but the flow sensor shall have a pressure balancer design that eliminate the pressure induced membrane deflection. The integrated sensing devices shall be able to be placed directly in a flow sensing package. The calibration shall register the flowrates from both of the flow sensing and thermal pressure sensing devices while the difference due to the pressure induced membrane deflection shall provide the pressure rating of the medium.

It is a further object of the present invention to utilize platinum as the thermistor material for registration of the thermal field changes due to the membrane deflection by the external pressure variations. Such materials are compatible with other sensing devices such as a thermal flow sensor. Other materials such as doped polysilicon, tungsten or magnesium oxide can also be used but either the platinum or doped polysilicon are the best of choice for cost control and easy integration and easy manufacture purpose. The platinum can be made via e-beam evaporation or physical vapor deposition (PVD) while the doped polysilicon can be made with low pressure chemical vapor deposition (LPCVD) or PVD.

It is yet another object of the present invention to utilize silicon nitride as the membrane materials. This material is compatible with the materials used in other devices such as a thermal flow sensor for easy integration of multiple sensing devices. For the benefit of contaminant resistance, the thermistors on the membrane are desired to be fabricated towards the reference cavity or thermal isolation cavity such that the sensing sensitivity shall not be altered due to surface deposits from the medium when packaged in an open channel with moving medium without contaminant screening or protection.

It is yet another object of the present invention to have the surface of the said membrane toward the measured medium be coated with thermal isolation materials such that the thermal field that the thermistors registered shall be provided dominantly from the reference cavity which shall be identical in each measurement. The said thermal isolation can be any solid materials bear the desired thermal properties. One typical example shall be zirconia oxide.

It is yet another object of the present invention to fabricate the said sensor to create a diaphragm structure on silicon or other similar wafer materials such that a cavity beneath the sensing materials could be easily manufactured for maximum thermal isolation and to provide the consistence for the said pressure measurement using the thermal field registration principle. This structure shall further beneficial to the reduction of the response time as the thermal equilibrium shall be much easier to be established.

It is an additional object to make the distribution of the thermistors on the membrane of the said diaphragm structure in paired formality and each of the individual thermistor has the identical and symmetric structure with respect to the other and against the thermistor that generates the heat field on the membrane. The paired thermistors are further desired to be placed in multiple locations and with different distances to the thermistor that generate heat on the membrane such that each pair can provide desired sensitivity at different measurement dynamic ranges.

It is an additional object to employ stat-of-the-art MEMS process technology and thin film deposition technology to manage the stress release and build in the said micro-sensor structure such that to ensure long term reliability of the said sensors. The process of the silicon nitride shall be preferably manufactured to a low stress formality and a balance of the materials in form of compressed stress shall be managed.

Other objects, features and advantages of the present invention will become apparent to those skilled in the art through the present disclosures detailed herein wherein like numerals refer to like elements.

BRIEF DESCRIPTIONS OF THE DRAWINGS

FIG. 13 (*a*) is an example of the package for absolute pressure sensing.

FIG. 13 (*b*) is an example of the package for gauge pressure sensing or differential pressure sensing.

DETAILED DESCRIPTION OF THE PREFERRED EMBODIMENTS

Figure 1:
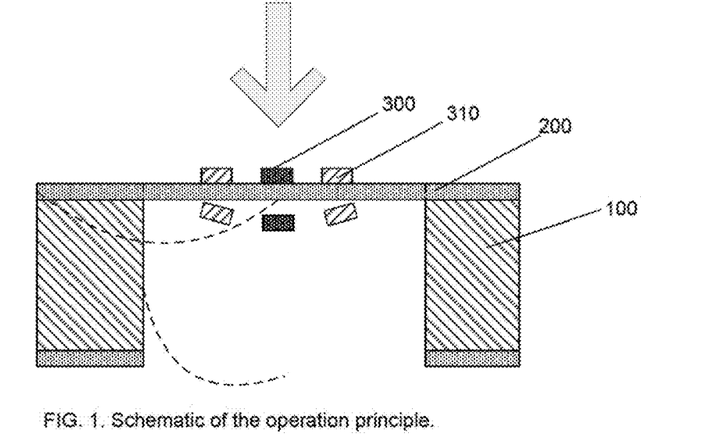
FIG. 1 is the schematics for the pressure sensing principle.

The preferred operation principle of the said micromachined pressure sensor is showed in FIG. 1. The pressure sensor is made of a micromachined diaphragm structure on a silicon substrate. The pressure sensing is based on the external pressure induced membrane mechanical defection of the diaphragm structure. A micro-heater on the said membrane creates a stable thermal field and at least one pair of the thermistors symmetrically or asymmetrically placed at the both side against the micro-heater. When an external pressure is applied to the one side of the said membrane, the membrane shall be deflected due to the mechanical force which shall result in a change in the thermal field due to the position changes of the thermistors, and the thermistors shall register such changes which are further correlated to the applied pressures. This sensing scheme is therefore referred as a thermal field pressure sensor (TFPS). Compared to the current most commonly applied pressure sensing technologies with the diaphragm or membrane structure, TFPS is much more sensitive in a large dynamic range as it senses the thermal field variations over the entire membrane rather than in a local regime. With the same amount of membrane deflection, the piezo resistors in a miniaturized formality can only sense the deflections in a very tiny zone which would not be easily to have the desired resolution and the dynamic range. In addition, the piezo resistors by itself shall have the hysteresis which would be difficult to have a stable offset. Capacitive sensing on the other hand will require the dielectric changes in a tiny gap. As the membrane deflection will not generate a homogeneous gap distances across the membrane, a non-linear behavior shall be inherent for the capacitive pressure sensing.

Figure 2:
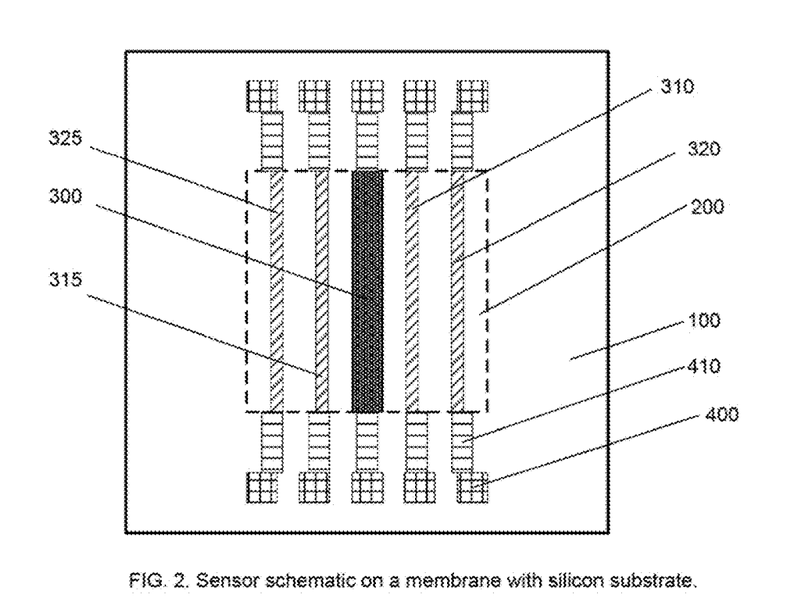
FIG. 2 is showing the configuration of the sensing elements on a membrane for the pressure sensing measurements.

The preferred embodiment of the sensing components of the said micromachined TFPS is illustrated in FIG. 2. The substrate of the sensor is preferably a silicon single crystal wafer 100, and the membrane 200 that supports the sensing diaphragm structure. Alternatively the substrate 100 can also be other materials such as ceramics or glass. The micro-heater 300 shall be preferably placed at the central of the membrane and the length of the micro-heater shall be the same as the dimension of the membrane or 90% of the membrane dimension such that the thermal field over the membrane created by the micro-heater shall be maximized. Two pairs of the temperature sensors or thermistors 310/315 and 320/325 shall be placed preferably symmetrically at the two sides with respectively to the micro-heater with a distance from 2 micron meters to a few hundred micron meters but shall be placed on the membrane. Alternatively, the said pair or two pairs of the temperature sensors or thermistors shall also be placed asymmetrically with respective to micro-heater for the purpose of enhancement of the offset stability as well as sensitivity. Additionally these temperature sensors or thermistors can be more than two pairs and the pairs in plural numbers shall also be placed symmetrically or asymmetrically with respective to the micro-heater. The material that forms the micro-heater and thermistors is preferably to be platinum but they could also be other stable materials such as nickel, tungsten or doped polysilicon. The pattern of these thermistors as well as the micro-heater can be the same in the form of a straight line with various linewidth from 2 micron meters to 6 micron meters or in other forms such as a zig-zag line to boost the sensitivity.

Figure 3:
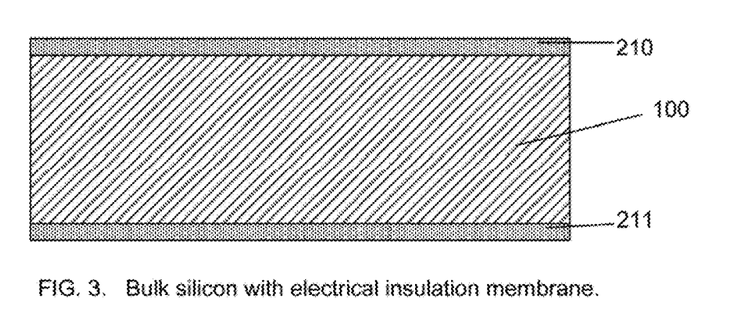
FIG. 3 shows the key process step for the making of a membrane for the pressure sensor on a silicon based substrate.

The preferred micromachining process for making of the said invention starts from the preparation of the membrane layer (210) of the diaphragm structure on the single crystal silicon substrate (100) with a thickness from 0.35 to 0.50 mm as shown in FIG. 3. The said layer shall be preferably made with low pressure chemical vapor (LPCVD) process at the low stress conditions such that the two surfaces of the substrate can be coated with the said layer simultaneously. The said layer is preferably a highly thermal conductive material such as silicon nitride or silicon carbide while it can also serve as the mechanical functional material for the diaphragm structure. The said layer on the one surface of the substrate shall be utilized as a layer of the membrane of the diaphragm structure, the layer on the other side of the substrate shall be served as the mask layer for making the thermal isolation and thermal sensing cavity. The said layer shall have a thickness of 50 to 1200 nm but preferably 300 nm to 1200 nm depending on the desired pressure sensing range or ranges. In order to sense a very high pressure, e.g. 350 MPa, the silicon nitride membrane made with LPCVD process shall not be able to maintain the necessary integrity with the desired thickness. The making of the membrane of the diaphragm structure shall alternatively utilize a pre-manufactured device such as silicon-on-oxide (SOI) where the silicon layer thickness of the device can be a few micron meters to a few tens of micron meters and shall be strong against the desired pressure rating.

Figure 4:
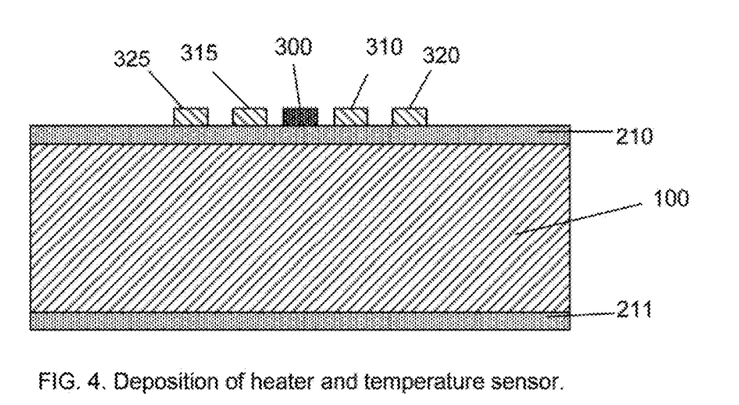
FIG. 4 is the key process step of formation of the sensing elements and the micro-heater on the membrane using silicon as the substrate.

The followed process shown in FIG. 4 is one of the key processes for the said invention. The micro-heater (300) generating the required thermal field for the sensing principle is made via the sputtering or electronic beam evaporation of the heater materials that can be platinum, nickel or tungsten. Alternatively it can be doped polycrystalline silicon via the LPCVD process. It is preferably to make the micro-heater by platinum for its heat efficiency and stability but in case the said micromachining process needs to be compatible metal on semiconductor (CMOS) process, doped polycrystalline silicon shall be the best of the choice. The thickness of the said micro-heater can be from 100 nm to 300 nm but preferably 200 nm. To enhance the adhesion, a thin layer of a few nanometers of titanium or chromium are made between the membrane layer of silicon nitride and the micro-heater materials. The pair of temperature sensors or thermistors (310/315 and 320/325) integrated together with the micro-heater shall provide the accurate measurement of the changes in the thermal field due to the membrane deflection by the applied external pressure. The materials of the temperature sensors or the thermistors are preferably platinum with a thickness the same as that for the micro-heater. In case of a CMOS process, doped polycrystalline silicon can be used for the making of the temperature sensor. In order to control the micro-heater power supply, additional temperature sensor or thermistor shall be made on the said silicon substrate which provides the environmental temperature variation feedbacks.

Figure 5:
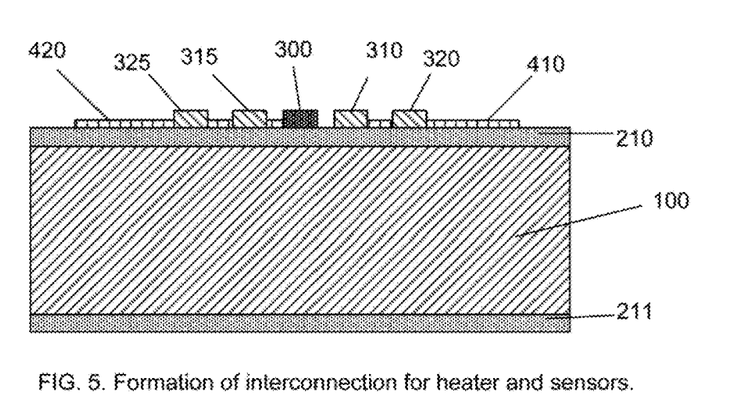
FIG. 5 shows the key process step of forming metallization or interconnections and the binding pads for connection of the sensing elements to control electronics.

The inter-connection of the micro-heater (300) as well as the pairs of the temperature sensors or thermistors (310/315 and 320/325) to the external control interface is illustrated in FIG. 5. These connections are done via the metallization process (410 and 420). The metallization is preferably made of gold with proper adhesion layers via sputter deposition or electronic beam evaporation due to that thin gold films have small resistance values that shall not have impact on the control electronic circuitry. The preferred thickness of the metallization is 100 to 500 nm but most preferably 200 to 250 nm. In case of a CMOS process, the inter-connection metallization shall be done with sputter or electron beam evaporation of aluminum with a thickness of 100 to 400 nm but preferably 200 to 300 nm. Additional chromium or titanium thin films can be made prior to the gold or aluminum preparation via PVD process with a preferably thickness of 10 to 30 nm.

Figure 6:
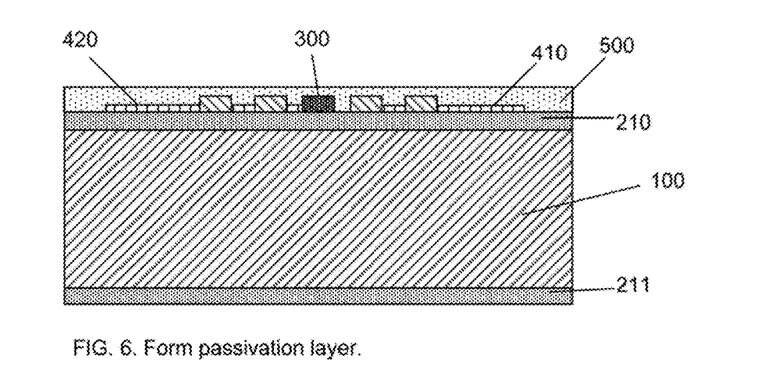
FIG. 6 shows the key process step of making the passivation layer for the sensing elements and the micro-heater.

In FIG. 6, passivation layer (500) between the micro-heater and the integrated pairs of temperature sensors or thermistors is made via the deposition of the electrically insert but thermally conductive materials on top of the micro-heater (300) and the pairs of the temperature sensors or thermistors (310/315 and 320/325). The preferable process of making the passivation layer shall be done via the physical vapor deposition or plasmas enhanced chemical vapor deposition (PECVD) of silicon nitride or silicon carbide with a thickness preferably from 100 to 500 nm but most preferably 250 to 350 nm. In preferable cases, silicon nitride is selected due to lower possibility of sharp particles inclusions during silicon carbide preparation that may be generated in this process step leading to difficulties in late process.

Figure 7:
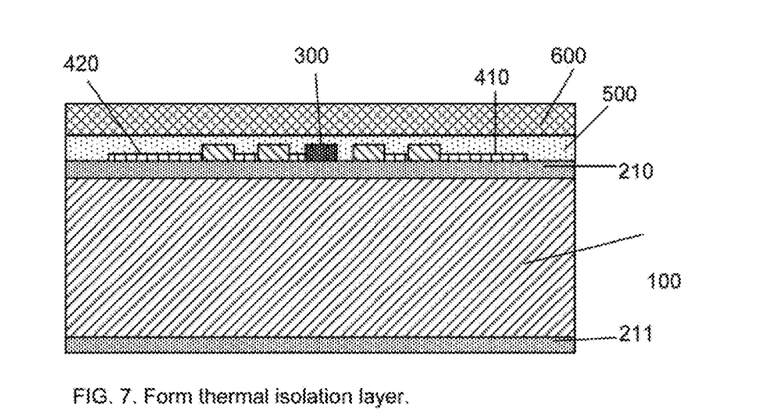
FIG. 7 shows the key process step of forming the one-side thermal isolation layer for the sensing elements such that the surface conditions shall have less effects to the measurements.

In order to avoid surface contamination that may alternate the precision of the thermal sensing values, a thermal isolation layer (600) as shown in FIG. 7 is deposited on top of the passivation layer (500). In this configuration, the thermistors shall not sense the changes in the thermal field in the free space over the surface of the thermal isolation layer (600). The said thermal isolation layer is preferably made via a physical vapor deposition process with a thickness of 1000 nm to 4000 nm but preferably 2000 nm directly on the passivation layer (500). The thermal isolation layer can be any low thermal conductive materials but for the compatible with the said process it is preferable to be materials such as silicon oxide, zirconia oxide, nickel mono oxide or monazite, but most preferably to be zirconia oxide.

Figure 8:
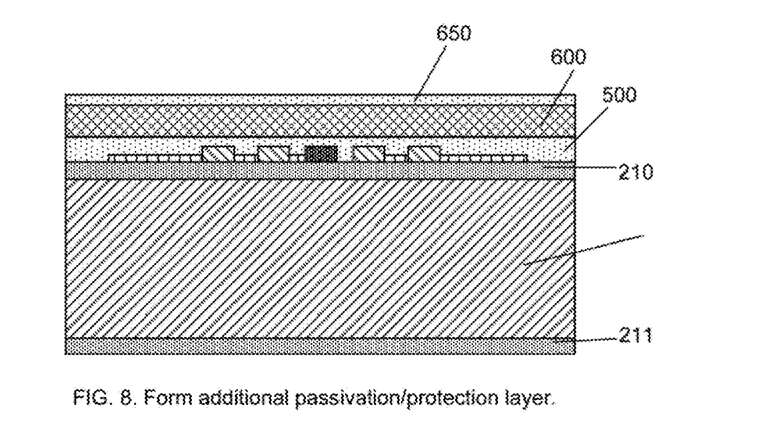
FIG. 8 shows the key process step to forming additional passivation layer for better media compatibility.

As shown in FIG. 8, the additional passivation or top surface passivation layer (650) for the completion of the membrane structure shall be made preferably via the physical vapor deposition or PECVD process. The additional passivation layer shall be utilized to protect the surface of the thermal isolation layer from attack by foreign materials such as corrosion agents. The said top surface passivation layer shall be preferably be chemically inert materials such as silicon nitride or silicon carbide and shall be made via PECVD with a thickness from 50 nm to 400 nm but most preferably 100 nm.

Figure 9:
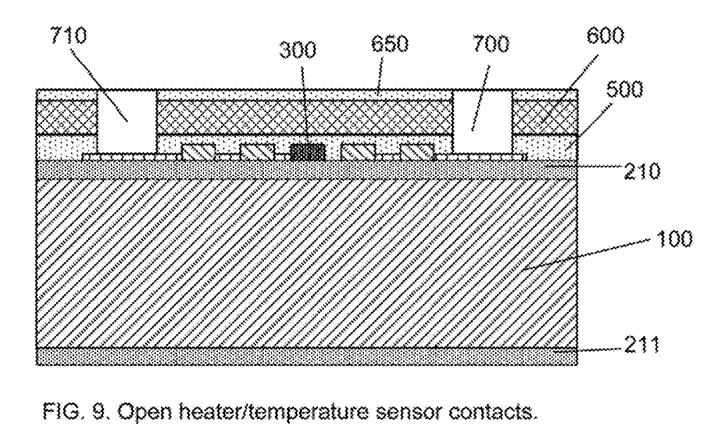
FIG. 9 shows the key process step to open the metal contacts for connection of the sensing elements to the control electronics.

The making of the connection of the micro-heater and the temperature sensors or thermistors to the external control interface is illustrated in FIG. 9 and is done via the dry ion etching to remove the surface passivation layer (650), the thermal isolation layer (600) as well as the thermistor isolation layer (500) and finally forms the access contacts (700 and 710) to the external electronic interface.

Figure 10:
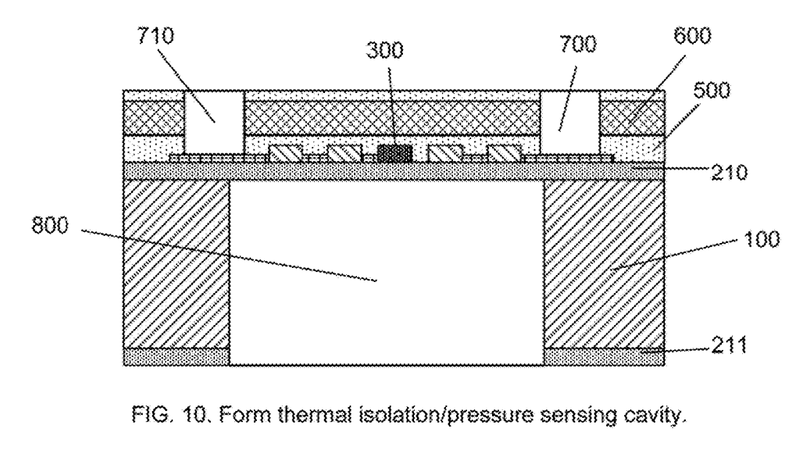
FIG. 10 shows the key process step of making the thermal isolation and sensing gas cavity underneath the membrane structure.

FIG. 10 shows the process that removes the bulk silicon material to form the sensing cavity (800) beneath the membrane structure. This cavity can also be used as the thermal isolation for the fast response. This process is preferably done with the deep reactive ion etching (DRIE) that shall stop automatically when the silicon material is completely removed and the reactive ions reach to the silicon nitride that is the bottom layer of the membrane structure. The DRIE shall also form a well-defined cavity with sharp walls which is necessary for a better footprint control. Alternatively the bulk silicon material can also be removed using the standard potassium hydroxide (KOH) solution or tetramethylammonium hydroxide solution (TMAH).

Figure 11:
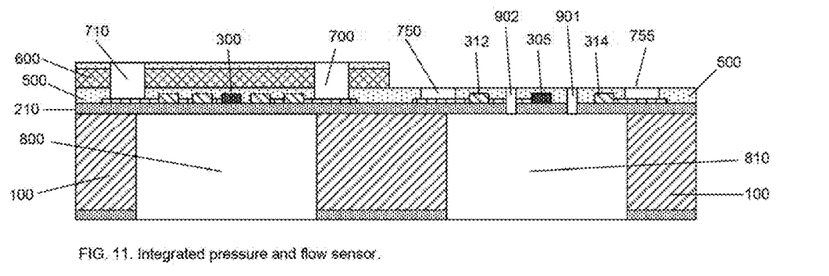
FIG. 11 shows the structure of an integrated pressure sensor and flow sensor.

For many of current application requirements, multi-parameter sensors are desired for better information acquisition, smaller footprint, power management as well as cost reduction. FIG. 11 shows the advantage of the current invention that can be seamlessly integrated with a mass flow sensor or time-of-flight flow sensor as the process for the said mass flow sensors bear the identical process only without the surface thermal isolation layer (600) and the additional surface passivation layer (650) which can be removed via dry ion etch from the surface for the flow sensor with an additional photomask. The opening of the contact for the interconnections on the flow sensor (750 and 755) can be done simultaneously with the process step when the contact 700 and 710 are formed as the selectivity of the said ion etching shall not attack the gold contacts on the flow sensor and the pressure sensor. The desired pressure balancers 901 and 902 can also be formed in the same step. The details of the flow sensor making can be found in the author's previous disclosures.

Figure 12:
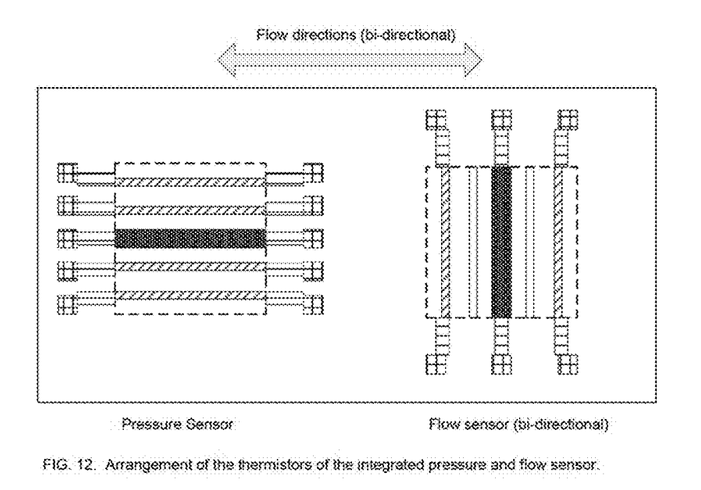
FIG. 12 shows the thermistor distribution of the integrated pressure sensor and flow sensor.

FIG. 12 shows the optimized configurations of the thermistors for the said integrated pressure sensor and flow sensor on a single chip with the indicated flow directions (flow sensor can be used for bi-directional flow measurement). The direction of the thermistors on the pressure sensor shall be perpendicular to those on the flow sensors such that the flow induced sensitivity can be minimized even though there is the thermal isolation layer 600 on the pressure sensor. For additional accuracy for both flow and pressure data acquisition, any possible such interchangeable effects could be calibrated out during ambient flow and pressure conditioning calibration.

Figure 13:
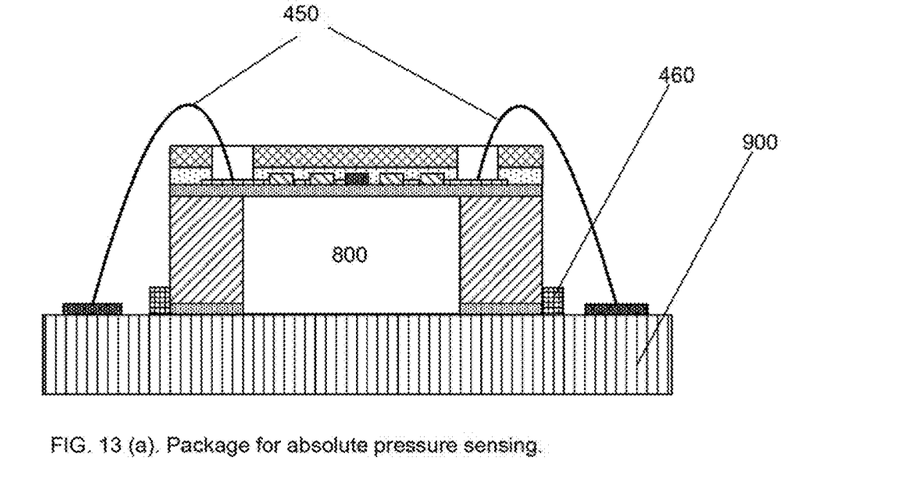

The present invented pressure sensor can be used for all types of pressure data acquisition upon proper package process. FIG. 13(*a*) is a preferably package illustration for the absolute pressure sensing scheme. The said pressure sensor shall be placed on a plate material (900) made of such as ceramic or other solid materials. Alternatively for a cost effective device, the said pressure sensor can also be placed on a normal printed circuitry board (PCB). The out edge of the contact between the pressure sensor and the plate or PCB shall be sealed with a material such as epoxy to ensure there would be no leakage after the package. For the optimized performance, the gas in the cavity (800) can be inert gases such as nitrogen or argon other than ambient air. For the gauge pressure or differential pressure data acquisition, the said plate or PCB shall have an opening (950) on the plate or PCB at the center and beneath the cavity of the said pressure sensor. This opening can be in contact with ambient in case of the gauge pressure measurement or connected to another pressure port in case of the differential pressure data acquisition.

Figure 14:
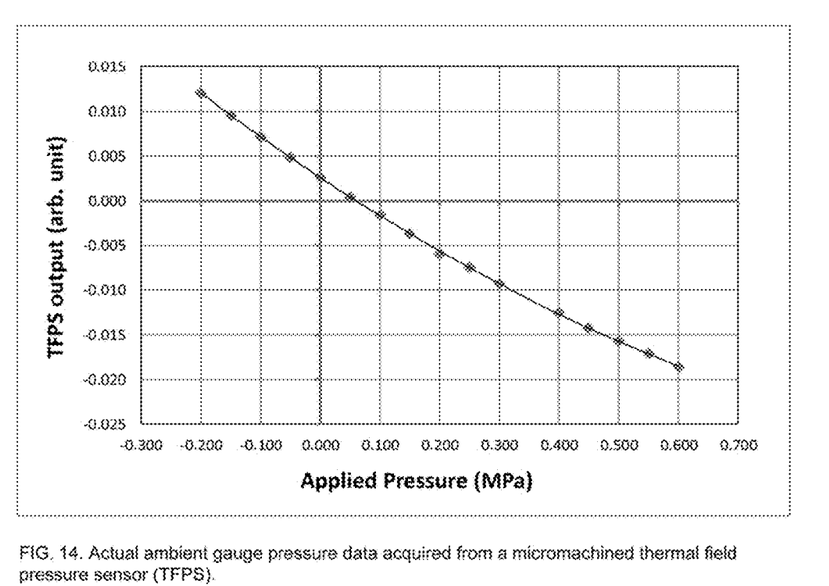
FIG. 14 one example of ambient gauge pressure data acquired from a micromachined thermal field pressure sensor (TFPS).

As it has been discussed in the preferred embodiment, the said TFPS shall be operated with a micro-heater that can be powered with a direct current or alternative current power via a driving circuitry. For the best of the performance, the power supply shall be modulated at a desired frequency such that a desired response shall be maintained. One example of the actual raw data for ambient gauge pressure from the said TFPS is shown in FIG. 14. The data are nearly linear at the lower pressure and having an extended dynamic range much larger than 200:1. With a proper data fitting the achievable dynamic range could be over 600:1 or larger. In case of the temperature changes in the measurement media, the symmetrical thermistor shall be sensing the same changing rate and thus it shall have a very stable offset against temperature.

The invention claimed is:

1. A micromachined pressure sensor that utilizes thermistors on a diaphragm structure to measure the pressure that was applied to the membrane of the diaphragm causing its membrane deflection; the changes in thermal field over the membrane due to the deflection are registered by the thermistors and correlated to the pressure rating; hereafter this pressure sensor is named as thermal field pressure sensor (TFPS).

2. A micromachined TFPS includes one pair or plural numbers of pairs of thermistors symmetrically or asymmetrically against a micro-heater on membrane that have the same diaphragm structure as of claim 1.

3. A micromachined TFPS of claim 1 includes an integrated micro-heater and temperature sensing for a precise control of the temperature.

4. A micromachined TFPS of claim 1 includes thermistors on membrane of a diaphragm structure that are made of platinum, tungsten, nickel or ploy-crystalline silicon, but preferably of platinum; each thermistor has a thickness ranging from 100 to 500 nm but most preferably 200 to 250 nm; in case of a CMOS process, the inter-connection metallization shall be done with sputter or electron beam evaporation of aluminum with a thickness of 100 to 400 nm but preferably 200 to 300 nm.

5. A micromachined TFPS having a diaphragm structure of claim 1; the membrane of the diaphragm is preferably to be made of thermal conductive materials such as silicon nitride or silicon carbide but most preferably silicon nitride with a thickness preferably from 50 to 500 nm but most preferably 100 nm.

6. A micromachined TFPS of claim 1 includes a passivation layer on top of thermistors made of thermal conductive materials such as silicon nitride or silicon carbide but most preferably silicon nitride with a thickness preferably from 100 to 500 nm but most preferably 250 to 350 nm.

7. A micromachined TFPS of claim 1 includes a thermal isolation layer on top of the passivation layer; the thermal isolation layer is preferably made of thermal isolation materials such as silicon oxide, zirconia oxide, nickel mono oxide or monazite, but most preferably to be zirconia oxide with a thickness of 1000 nm to 4000 nm but preferably 2000 nm.

8. A micromachined TFPS of claim 1 having a cavity; wherein the cavity shall be used for sensing chamber in case of gas pressure sensing where the thermistors utilize the cavity as the reference gas medium.

9. A micromachined TFPS of claim 1 having a cavity; the cavity shall be used additionally to provide thermal isolation to achieve a fast response for both gas and liquid pressure sensing.

10. A micromachined TFPS of claim 1 includes options in packages; the package shall allow to apply for absolute pressure, gauge pressure and differential pressure sensing.

11. A micromachined TFPS of claim 1 includes the capability of seamlessly integration with a flow sensor; the process and structure of the TFPS and a thermal flow sensor share the process and can be made via the same MEMS process and integrated on a single chip.

12. A micromachined TFPS comprised of
 a. A silicon substrate (100) with silicon nitride as the membrane structural materials (210) for the said diaphragm structure to achieve the thermal sensing mechanical configurations;
 b. An integrated micro-heater (300) and pairs of temperature sensors or thermistors (310/315 and 320/325) deposited on the membrane of silicon nitride, comprising of platinum or poly-silicon materials with interconnection (410/420) made of gold or aluminum materials;
 c. A passivation layer (500) of silicon nitride on top of the micro-heater and the temperature sensors or thermistors;
 d. A thermal insolation layer made of zirconia oxide (600) on top of the passivation layer to provide insulation for the reduction of media interference;
 e. An additional surface passivation layer (650) made of silicon nitride to protect the device from attacking by corrosive agent;
 f. An access or opening (700/710) for connecting the TPFS to control electronics;
 g. A cavity 800 beneath the membrane of the diaphragm structure provides the sensing reference as well as thermal isolation for boost of device response time;
 h. When integrating the TFPS with a thermal flow sensor additional mask and etch step is applied to remove thermal isolation layer and the additional passivation over the flow sensing area with openings as pressure balance.

* * * * *